United States Patent [19]

Du

[11] 4,132,835

[45] Jan. 2, 1979

[54] PRESSURE SENSITIVE MAGNETIC IMAGE TRANSFER MEDIA

[75] Inventor: Elbert Du, Cincinnati, Ohio

[73] Assignee: Frye Copysystems, Inc., Des Moines, Iowa

[21] Appl. No.: 781,116

[22] Filed: Mar. 25, 1977

[51] Int. Cl.$^2$ .................... H01F 1/28; B32B 27/32

[52] U.S. Cl. .................... 428/522; 252/62.54; 252/62.56; 427/128; 427/146; 428/523; 428/539; 428/900; 428/914

[58] Field of Search .................... 428/900, 914, 539, 515, 428/522, 523; 427/146, 147, 128; 252/62.54, 62.56

[56] References Cited

U.S. PATENT DOCUMENTS

| | | | |
|---|---|---|---|
| 3,387,993 | 6/1968 | Flowers | 427/128 X |
| 3,404,021 | 10/1968 | Newman et al. | 427/128 X |
| 3,419,420 | 12/1968 | Stahly | 427/128 X |
| 3,515,906 | 6/1970 | Lazzarini | 427/128 X |
| 4,032,682 | 6/1977 | Masson et al. | 428/523 X |
| 4,049,843 | 9/1977 | Gaynor | 428/914 X |

*Primary Examiner*—Harold Ansher
*Attorney, Agent, or Firm*—Nims, Howes, Collison & Isner

[57] ABSTRACT

Pressure sensitive magnetic image transfer media in the form of a thin film substrate having a thin layer of solvent evaporated residue of a liquid mixture incorporating substantially equal dispersed amounts of polyethylene homopolymer and magnetically sensible material with small amounts of mutually incompatible dissolved acrylic film forming resin material and ethyl hydroxyl ethyl cellulose.

1 Claim, No Drawings

PRESSURE SENSITIVE MAGNETIC IMAGE TRANSFER MEDIA

SPECIFICATION

This invention relates to improved pressure sensitive magnetic image transfer media.

Pressure sensitive image transfer media of diverse character are widely employed in the duplicating arts. The increasing utilization of electronic data processing equipment and the attendant utilization of automatic mark-sensing for data input thereto have created a continued demand for improved magnetically sensible transfer media that provides transferred images of a character that maintain a high degree of transferred image definition and intensity under conditions of repeated automated usage over extended periods of time. In particular, there presently exists a need for improved pressure sensitive transfer media that will provide highly smear and smudge resistant magnetically sensible transfer images with a markedly increased degree of definition and intensity to the end of producing and reproducting, over extended periods of time and under conditions of repetitive usage, effectively identical signal levels with a high degree of discrimination in automatic sensing equipment.

As is recognized in the magnetically sensible transfer media art, the attaining of the conjoint objectives of a high degree of smudge and smear resistance, sharpness of transfer and high intensity of transferred image as well as a high degree of adhesion to the carrier and receptor substrates with a concomitant ready transfer of substantially all of the imaging materials in response to a predetermined level and pattern of applied pressure constitute essentially antithetical requirements and the presence of a greater degree of one such advantageous characteristic can normally be obtained only at the expense of the others.

This invention may be briefly described as an improved magnetic image transfer media comprising a single layer of a transferable magnetic coating composition disposed on a thin film substrate. In its broad aspects, the subject invention includes a substrate having a thin layer constituting the solvent evaporated residue of a selectively constituted liquid mixture incorporating substantially equal dispersed amounts of polyethylene homopolymer and magnetically sensible material in combination with relatively small but proportioned amounts of dissolved mutually incompatible low viscosity ethyl hydroxyl ethyl cellulose and an acrylic film forming resinous polymer.

Among the advantages of the subject invention is the provision of pressure sensitive transfer media for effecting the transfer of highly smear and smudge resistant magnetically sensible images. Still other advantages include the permitted transfer of magnetically sensible images having a high degree of definition and intensity and which are capable of producing and reproducing over extended periods of time and under conditions of repetitive usage, effectively identical signal levels with a high degree of discrimination in automatic sensing equipment. Still other advantages include the provision of magnetically sensible transfer images of enduring quality with minimal degradation of discrimination attendant upon repetitive usage thereof.

The object of this invention is the provision of an improved magnetic image transfer media.

Other objects and advantages will become apparent from the following portions of this specification which delineates and describes presently preferred embodiments of magnetic image transfer media formulated in accord with the principles of this invention.

In the broader aspects of the practice of the subject invention, a thin layer of a uniformly dispersed suspension of substantially equal amounts of finely divided magnetically sensible material and a polyethylenic homopolymer of predetermined character in an evaporable solvent having relatively small but critically related amounts of a mixture of a low viscosity ethyl hydroxyl ethyl cellulose and an acrylic film forming resinous polymer dissolved therein is applied to a carrier substrate film of synthetic resinous material, after which the solvent is evaporated to leave an improved magnetic image transfer film as the residum thereof.

In the preferred practice of the invention, the carrier substrate film is desirably constituted of a thin flexible film, suitably of ribbon like character, of polyethylene or of polyester and whose particular physical characteristics will be determined, at least in part, by the nature of the applied pressure patterns of the contemplated mode of usage thereof.

The magnetically sensible material included in the transfer layer may constitute any of the well known magnetically responsive materials and the utilization of finely divided magnetic iron oxide of a density of about 4.8 gr/cc and oil absorption of about 50g/110g in amounts varying between about 35–50% of the finished transfer coating (dry basis) is presently preferred.

The polyethylene homopolymer is believed to contribute to the smudge resistant character of the transferred image and to serve as a protective element in the transfer coating because of migration to the film surface. The amount thereof in the finished film should be desirably substantially equal to that of the magnetically sensible material, i.e. in an amount varying between about 40–45% of the finished transfer coating (dry basis). A presently preferred polyethylene homopolymer particularly adapted for use in the subject invention is Allied Chemical's AC 1702. Such AC 1702. has a density of about 0.88 gr/cc (ASTM D-1505), a softening point of about 85° C. (ASTM E-28), a hardness of about 90 dmm (ASTM D-5), and a viscosity of about 40 cps (Brookfield at 140° C.).

Operatively associated with the primary components as outlined above are relatively small but operatively critical amounts of mutually incompatible ethyl hydroxyl ethyl cellulose and an acrylic film forming resinous material. The acrylic film forming resinous material suitably comprises alkyd compatible acrylic ester resins that are possessed of relatively rapid air drying speeds and which provide the desired degree of hardness in the finished transfer layer. A presently preferred material is an isobutyl methacrylate polymer such as Acryloid B-67 as manufactured by the Rohm & Haas Company and such may desirably comprise between 3 to 10% of the finished transfer coating. Such Acryloid B-67 is commercially available in the form of about 40% resin solids in VM & P naptha at about 7 pounds per gallon, having a viscosity of 900–1600 cps at 25° C., an open cup flash point (TOC) of 56° C and a clear film ultimate hardness (Tukon) of 11-12.

A presently preferred ethyl hydroxyl ethyl cellulose is Hercules Inc.'s EHEC. Such material is the "extra low" viscosity type having 10–20 cps (at 5% concentration by weight and at 25° C. in 80:20 toluene:ethanol)

and comprises colorless and odorless granules having a bulk density of from 19 to 22 lbs./cu.ft.; a specific volume in solution of 24.5 cu.in./lb.; an unplasticized flow temperature (ASTM D-569-48) of over 175° C. and a film density of 1.12 g./cc.

A preferred evaporable solvent for the acrylic film forming resin and the ethyl hydroxyl ethyl cellulose modifier is conventional lacquer diluent, a low aromatic content solvent blend of paraffinic and naphthenic factions in a typical ratio of Paraffinic — 53%
Naphthenic — 34%
Aromatic — 13%

In the production of pressure sensitive magnetic image transfer media in accord with the principles of this invention, a liquid mixture is formed by (a) dissolving about 1.25 to 1.75 parts of the alkyd compatible acrylic ester resin together with about roughly about double that amount of ethyl hydroxyl ethyl cellulose in about 50 to 65 parts of lacquer diluent; (b) to such solution about 13 to 22 parts of finely divided magnetic metal oxide and about an equal amount of polyethylene homopolymer is added and the mixture is agitated to obtain a uniform dispersion of the constituents therein. Such liquid mixture is applied as a thin film to one surface of a thin polyethylene or polyester film and subjected to heat to evaporate the solvent components in the liquid mixture. The residue of the applied liquid film constitutes a transfer film or layer of improved characteristics as earlier described.

The finished film, assuming substantially complete evaporation of the solvent components will be constituted of about 40 to 45 parts each of magnetic oxide and polyethylenic homopolymer, about 3 to 5 parts of the alkyd compatible acrylic ester and about roughly double such amount of ethyl hydroxyl ethyl cellulose.

By way of specific example, the following formulations have provided pressure sensitive magnetic image transfer media of improved character, the dry basis formulations assuming the presence of no evaporated solvent in the coating:

| Example 1 | Wet Basis | Finished Coating (Dry Basis) |
| --- | --- | --- |
| Magnetic oxide | 14.3 | 43.6 |
| Polyethylene homopolymer | 14.3 | 43.6 |
| Alkyd compatible acrylic ester (40% solids) | 3.6 (1.44 plus 2.16) | 4.4 |
| Lacquer diluent | 65.0 | — |
| Ethyl hydroxyl ethyl cellulose | 2.8 | 8.5 |

| Example 2 | Wet Basis | Finished Coating (Dry Basis) |
| --- | --- | --- |
| Magnetic oxide | 20.0 | 43.8 |
| Polyethylene homopolymer | 20.0 | 43.8 |
| Alkyd compatible acrylic ester (40% solids) | 4.0 (1.6 plus 2.4) | 3.5 |
| Lacquer diluent | 52.0 | — |
| Ethyl hydroxyl Ethyl cellulose | 4.0 | 8.77 |

Having thus described my invention, I claim:

1. A pressure sensitive magnetic image transfer medium formed of a planar flexible substrate film of synthetic resinous material a transfer layer adherently secured to one surface of said substrate film and from which localized portions are selectively transferable to a copy surface in response to pressure application to the obverse surface of said substrate film said transfer layer consisting essentially of the uniformly dispersed intermixture of about 40 to 45 parts each of a polyethylenic homopolymer and finely divided magnetic metal oxide, about 3 to 5 parts of an alkyd compatible acrylic ester resin and about 6 to 10 parts of ethyl hydroxyl ethyl cellulose being mutually incompatible with the alkyd acrylic ester resin.

* * * * *